United States Patent
Wei et al.

(10) Patent No.: US 9,379,887 B2
(45) Date of Patent: Jun. 28, 2016

(54) EFFICIENT CRYPTOGRAPHIC KEY STREAM GENERATION USING OPTIMIZED S-BOX CONFIGURATIONS

(71) Applicant: QUALCOMM Incorporated, San Diego, CA (US)

(72) Inventors: Justin Y. Wei, San Diego, CA (US); Antoine Dambre, Grasse (FR); Christopher Ahn, San Diego, CA (US); Gurvinder Singh Chhabra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/024,424

(22) Filed: Sep. 11, 2013

(65) Prior Publication Data
US 2014/0079215 A1    Mar. 20, 2014

Related U.S. Application Data

(60) Provisional application No. 61/701,418, filed on Sep. 14, 2012.

(51) Int. Cl.
*H04L 9/08* (2006.01)
*H04L 9/06* (2006.01)

(52) U.S. Cl.
CPC ............ *H04L 9/0816* (2013.01); *H04L 9/0662* (2013.01); *H04L 9/0668* (2013.01); *H04L 2209/12* (2013.01); *H04L 2209/122* (2013.01)

(58) Field of Classification Search
CPC ..... H04L 9/0668; H04L 9/065; H04L 9/0656; H04L 9/0662; H04L 9/0675
See application file for complete search history.

(56) References Cited

U.S. PATENT DOCUMENTS

| 6,031,911 A | 2/2000 | Adams et al. |
| 2004/0047468 A1 | 3/2004 | Muller et al. |

(Continued)

FOREIGN PATENT DOCUMENTS

WO    WO-2008053980 A1    5/2008

OTHER PUBLICATIONS

3GPP Task Force: "Specification of the 3GPP Confidentiality and Integrity Algorithms 128-EEA3 & 128-EIA3, Document 2: ZUC Specification," ETSI/SAGE Specification, Jun. 28, 2011, pp. 1-18, XP055121967.

(Continued)

*Primary Examiner* — Saleh Najjar
*Assistant Examiner* — Devin Almeida
(74) *Attorney, Agent, or Firm* — Norton Rose Fulbright US LLP

(57) ABSTRACT

Application of a ZUC cryptographic functions in wireless communication includes receiving a data stream at the wireless communication apparatus and applying the ZUC cryptographic function to the data stream. The ZUC cryptographic function includes generating at least one multi-byte pseudo-random number that provides an index to one of a plurality of substitution boxes. Each of the substitution boxes is further based on one or more normative substitution boxes. The ZUC cryptographic function further includes retrieving a value from each of the substitution boxes using each byte of the multi-byte pseudo-random number, assembling the retrieved values into at least one substituted values, and generating at least one key value based on the substituted values, wherein the key value is used in applying the ZUC cryptographic function to the data stream. The method also includes processing the data stream after application of the ZUC cryptographic function.

20 Claims, 7 Drawing Sheets

(56) References Cited

U.S. PATENT DOCUMENTS

2010/0115286 A1 5/2010 Hawkes et al.
2010/0228992 A1 9/2010 Fang
2012/0093313 A1 4/2012 Michiels
2012/0260103 A1 10/2012 Nam et al.

OTHER PUBLICATIONS

International Search Report and Written Opinion—PCT/US2013/059491—ISA/EPO—Jun. 24, 2014.

EFFICIENT CRYPTOGRAPHIC KEY STREAM GENERATION USING OPTIMIZED S-BOX CONFIGURATIONS

CROSS-REFERENCE TO RELATED APPLICATIONS

This application claims the benefit of U.S. Provisional Patent Application No. 61/701,418, entitled, "EFFICIENT CRYPTOGRAPHIC KEY STREAM GENERATION USING OPTIMIZED S-BOX CONFIGURATIONS", filed on Sep. 14, 2012, which is expressly incorporated by reference herein in its entirety.

BACKGROUND

1. Field

Aspects of the present disclosure relate generally to wireless communication systems, and more particularly, to efficient cryptographic key stream generation using optimized substitution box (S-box) configurations.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving a data stream at a wireless communication apparatus for a cryptographic operation using a ZUC algorithm, applying a cryptographic function to the data stream, wherein the cryptographic function includes: obtaining a predetermined number of input bits and generating at least one multi-byte pseudo-random number based in part on the input bits, wherein each byte of the at least one multi-byte pseudo-random number provides an index to a different one of a plurality of optimized substitution boxes, each optimized substitution box comprising a plurality of values derived from a corresponding normative ZUC substitution box, obtaining a value from each of the plurality of optimized substitution boxes using a corresponding byte of the at least one multi-byte pseudo-random number, and generating at least one key value based on the values obtained from the optimized substitution boxes, wherein the key value is used in connection with applying the ZUC cryptographic algorithm to the data stream. The method further includes processing the data stream with the at least one key value.

In an additional aspect of the disclosure, an apparatus configured for wireless communication. The apparatus includes means for receiving a data stream at a wireless communication apparatus for a cryptographic operation using a ZUC algorithm, means for applying a cryptographic function to the data stream, wherein the cryptographic function includes: means for obtaining a predetermined number of input bits and means for generating at least one multi-byte pseudo-random number based in part on the input bits, wherein each byte of the at least one multi-byte pseudo-random number provides an index to a different one of a plurality of optimized substitution boxes, each optimized substitution box comprising a plurality of values derived from a corresponding normative ZUC substitution box, means for obtaining a value from each of the plurality of optimized substitution boxes using a corresponding byte of the at least one multi-byte pseudo-random number, and means for generating at least one key value based on the values obtained from the optimized substitution boxes, wherein the key value is used in connection with the means for applying the ZUC cryptographic algorithm to the data stream. The apparatus further includes means for processing the data stream with the at least one key value.

In an additional aspect of the disclosure, a computer program product has a computer-readable medium having program code recorded thereon. This program code includes code to receive a data stream at a wireless communication apparatus for a cryptographic operation using a ZUC algorithm, code to apply a cryptographic function to the data stream, wherein the cryptographic function includes: code to obtain a predetermined number of input bits and code to generate at least one multi-byte pseudo-random number based in part on the input bits, wherein each byte of the at least one multi-byte pseudo-random number provides an index to a different one of a plurality of optimized substitution boxes, each optimized substitution box comprising a plurality of values derived from a corresponding normative ZUC substitution box, code to obtain a value from each of the plurality of optimized substitution boxes using a corresponding byte of the at least one multi-byte pseudo-random number, and code to generate at least one key value based on the values obtained from the optimized substitution boxes, wherein the key value is used in connection with the code to apply the ZUC cryptographic algorithm to the data stream. The computer program product further includes code to process the data stream with the at least one key value.

In an additional aspect of the disclosure, an apparatus includes at least one processor and a memory coupled to the processor. The processor is configured to receive a data stream at a wireless communication apparatus for a cryptographic operation using a ZUC algorithm, to apply a cryptographic function to the data stream, wherein the cryptographic function includes configuration of the at least one processor: to obtain a predetermined number of input bits and to generate at least one multi-byte pseudo-random number based in part on the input bits, wherein each byte of the at least one multi-byte pseudo-random number provides an index to a different one of a plurality of optimized substitution boxes, each optimized substitution box comprising a plurality of values derived from a corresponding normative ZUC substitution box, to obtain a value from each of the plurality of optimized substitution boxes using a corresponding byte of the at least one multi-byte pseudo-random number, and to generate at least one key value based on the values obtained from the optimized substitution boxes, wherein the key value is used in connection with the configuration of the at least one processor to apply the ZUC cryptographic algorithm to the data stream. The apparatus further includes configuration of the at least one processor to process the data stream with the at least one key value.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
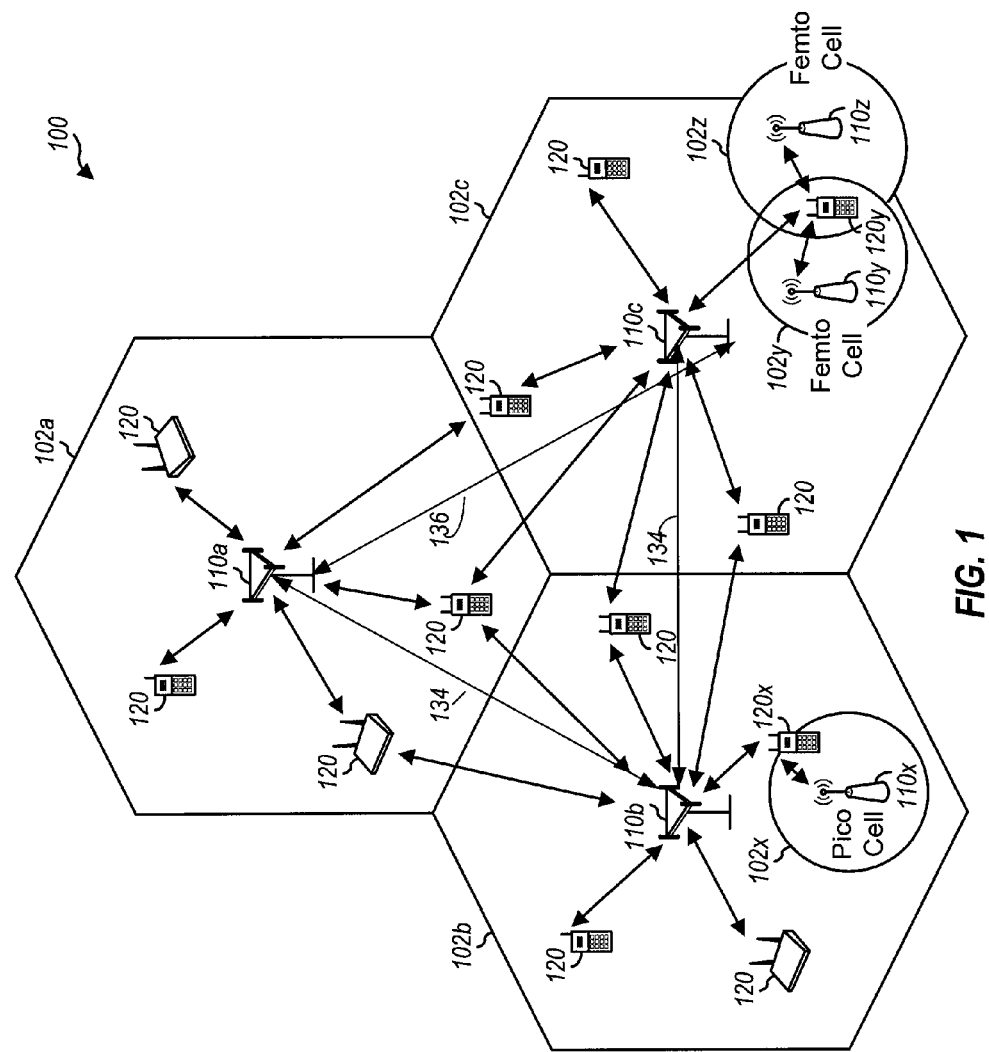
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

Figure 2:
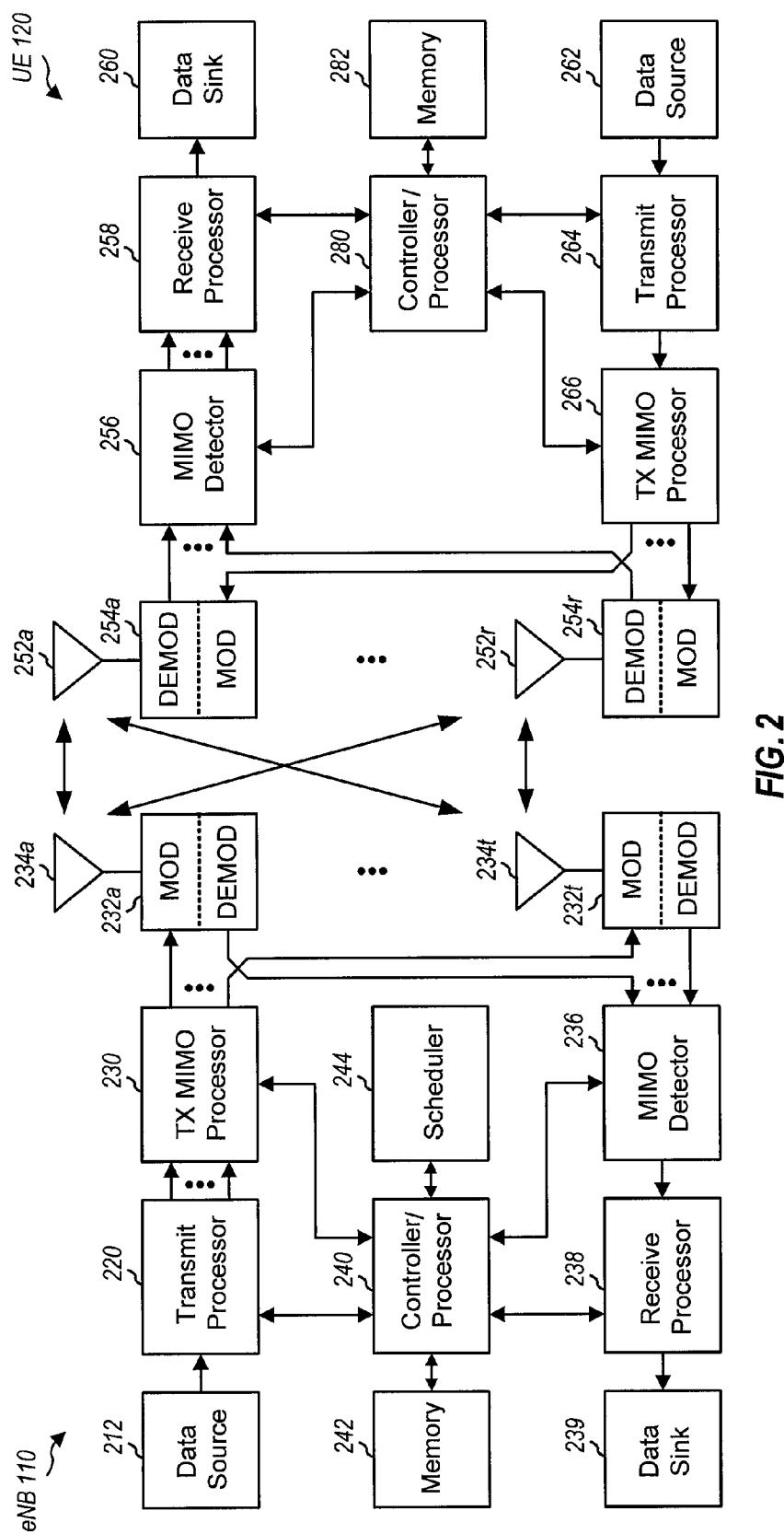
FIG. 2 is a block diagram illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIG. 6, and/or other processes for the techniques described herein. The memories 242 and 582 may store data and program codes for the eNB 110 and the UE 120, respectively. A scheduler 244 may schedule UEs for data transmission on the downlink and/or uplink.

Aspects of the present disclosure propose techniques for ciphering packets in a communication layer in order to reduce the just-in-time or runtime processing complexity of transmit and receive data paths while maintaining the same level of security in the system.

Figure 3:
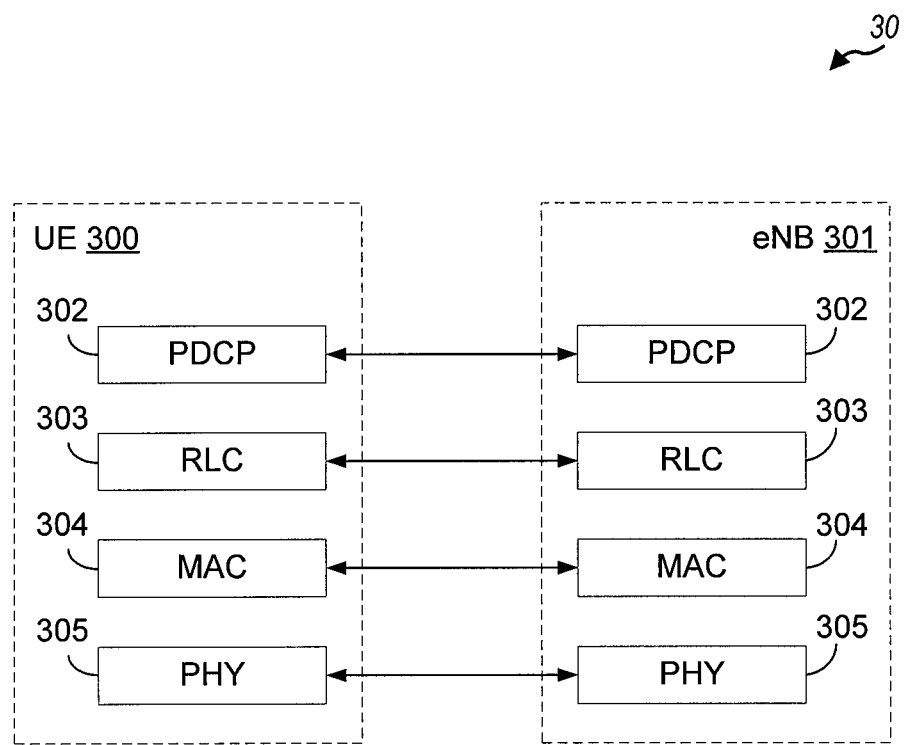
FIG. 3 is a block diagram illustrating the user plane protocol stack for a transmitter and receiver in the LTE standard.

In a wireless communication system, transmitters and receivers may communicate through a multiple layer protocol stack. FIG. 3 is a block diagram illustrating a user plane protocol 30 for communication between UE 300 and eNB 301 in the LTE standard. The LTE protocol stack may include a packet data convergence protocol (PDCP) layer 302, a radio link control (RLC) layer 303, a media access control (MAC) layer 304, and a physical (PHY) layer 305. PHY layer 305 performs the physical transport of data between UE 300 and eNB 301.

Communication between layers in the LTE protocol stack is facilitated through service data units (SDUs) and protocol data units (PDUs). On the transmitter side, whether the transmitter is UE 300 or eNB 301 in any particular communication instant, each layer receives SDUs from a higher layer and sends PDUs to a lower layer. That is, at each protocol layer, the data from the SDU is read, modified, and converted into PDU. Examples of modifications performed may include the addition of headers to the SDU and the addition of padding bits. The PDUs are treated as SDUs by the lower layer. For a typical data transmission, the PDCP layer receives packets (PDCP SDUs) from an upper layer and processes them into PDCP PDUs which are submitted to a lower layer. When security is configured, part of this processing includes ciphering or encrypting of data packets. Radio resource control (RRC) messages communicated in the control plane of LTE communications would be both ciphered and integrity protected by the PDCP layer, while user plane data may only be ciphered in the PDCP layer. Other layers, including non-access stratum (NAS), may also include ciphering and integrity operations into their data processing. For example, NAS messages, which are within the control layer, may be ciphered and integrity protected by the NAS layer. The ciphering schemes which are described as a part of the various aspects of the present disclosure may apply to ciphering that may occur on any layer of the communication process, including the PDCP layer, NAS layer, and the like.

In cryptography, the original text or information is generally referred to as "plain text" while the encoded or altered text or information is generally referred to as "cipher text." The conversion from plain text to cipher text is generally referred to as encoding, encrypting, enciphering, and the like, while the reverse operation is generally referred to as decoding, decrypting, deciphering, and the like. The encrypted data is sent over the public network and is decrypted by the intended recipient. Encryption typically operates by processing the data through a special encryption formula using a special combination of initialization data. Both the sender and receiver know this encryption formula and initialization data, which may be used to encrypt and decrypt the data by generating and applying an encryption key.

Numerous examples of encryption algorithms exist that have been used in communication systems. For example, RC4 is a widely used software stream cipher in popular protocols such as Secure Sockets Layer (SSL) and Wireless Encryption Protocol (WEP), and the like. In cellular communications, examples of encryption algorithms include Advanced Encryption Standard (AES), SNOW 3G, ZUC, and the like.

It is important that cellular communications be protected with encryption and integrity checks. Otherwise, it would be relatively easy for a technically knowledgeable person to monitor the traffic and/or alter the identity of the sender or receiver. Lack of security could lead to identify theft and loss of data, and also could allow an unauthorized third party to create a clone of the mobile device that would be recognized by the wireless network as the original device, potentially causing incorrect charges being assessed to the original device owner. However, there is a trade-off between security and performance and power efficiency. In order to achieve a high degree of security over a long period of time, a large amount of computational power is required. In a mobile platform, diverting computational power to security would degrade performance of the mobile device and greatly decrease battery life. To avoid this degradation of performance and battery life, optimizations are used to make specific tasks execute more efficiently.

The ZUC algorithm has been adopted as one of the standard encryption algorithms for 3GPP confidentiality and integrity operations. ZUC is a symmetric stream cipher algorithm that continuously generates ciphering keys that may be used both for encryption and decryption. The algorithm works in three main stages: Linear Feedback Shift Register (LFSR), Bit-Reorganization, and a non-linear function, F. The stages occur in this order with the non-linear function, F, outputting a 32-bit ciphering key. The next 32-bit ciphering key is generated by going through all of the stages again. Within the processing stages, various mathematical functions and techniques are used to generate properties of pseudo-randomness, so that the output appears random even though it is easily reproducible using the same initialization information.

Figure 4:
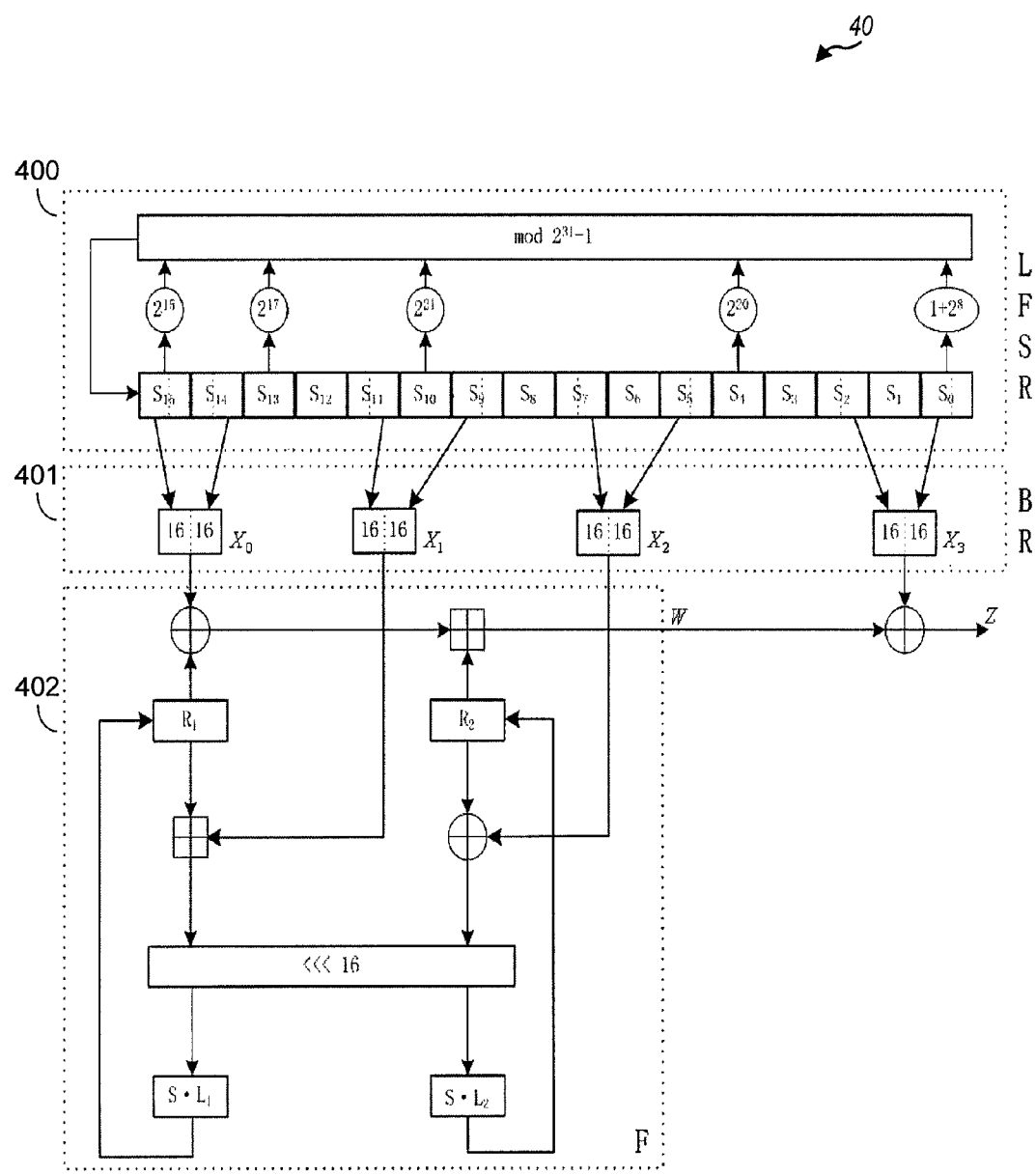
FIG. 4 is a block diagram illustrating ZUC application layers.

FIG. 4 is a block diagram illustrating ZUC application layers 40. The ZUC application layers 40 may be implemented in a combination of software and hardware elements in a UE or eNB for generating the stream of ciphering keys. The first layer of ZUC application layers 40 is the linear feedback shift register (LFSR) 400. The LFSR 400 has 16 of 31-bit cells ($s_0, s_1, \ldots, s_{15}$). Each cell $s_i$ ($0 \le i \le 15$) is restricted to take values from the set $\{1, 2, 3, \ldots, 2^{31}-1\}$.

The LFSR 400 operates in two modes: initialization mode and working mode. While in the initialization mode, the LSFR 400 receives a 31-bit input word, u, which is obtained by removing the rightmost bit from the 32-bit output W of the previous operation of the non-linear function, F 402, that is u=W>>1, the output W shifted by 1-bit to the right. The input word, u, is processed according to the following formula:

$$v = 2^{15} s_{15} + 2^{17} s_{13} + 2^{21} s_{10} + 2^{20} s_4 + (1+2^8) s_0 \bmod(2^{31}-1) \quad (1)$$

and $$s_{16} = (v+u) \bmod(2^{31}-1) \quad (2)$$

If $s_{16}=0$, then $s_{16}=2^{31}-1$. The values for $s_1, s_2, \ldots, s_{15}, s_{16}$) will be assigned into $s_0, s_1, \ldots, s_{14}, s_{15}$).

While in the working mode, LSFR 400 does not receive any input and operates according to the formula:

$$s_{16} = 2^{15} s_{15} + 2^{17} s_{13} + 2^{21} s_{10} + 2^{20} s_4 + (1+2^8) s_0 \bmod(2^{31}-1) \quad (3)$$

As with the operation during the initialization mode, if $s_{16}=0$, then $s_{16}=2^{31}-1$. The values for $s_1, s_2, \ldots, s_{15}, s_{16}$ will be assigned into $s_0, s_1, \ldots, s_{14}, s_{15}$. Because the multiplication of a 31-bit string s by $2^i$ over a Galois field (GF) ($2^{31}-1$) may be implemented using a cyclic shift of s to the left by i bits, only the addition of modulo $2^{31}-1$ in equations (1) and (3) are needed. In fact, equations (1) and (3) may be implemented according to the following formula:

$$v = (s_{15} <<<_{31} 15) + (s_{13} <<<_{31} 17) + (s_{10} <<<_{31} 21) + (s_4 <<<_{31} 20) + (s_0 <<<_{31} 8) + s_0 \bmod(2^{31}-1) \quad (4)$$

Where the values of s are cyclically shifted to the left as if they were in 31-bit registers, according to the indicated amounts with the addition of $s_0 \bmod (2^{31}-1)$.

For two elements, a, b over GF ($2^{31}-1$), the computation of $v=a+b \bmod(2^{31}-1)$ may be performed by (1) computing v=a+b, and (2) if the carry bit is 1, then v=v+1. Alternatively, $v=a+b \mod(2^{31}-1)$ may be performed by (1) computing $w=a+b$, where w is a 32-bit value, and (2) setting v=(least significant 31 bits of w)+(most significant bit of w).

The second layer of ZUC application layers 40 is the bit reorganization layer (401). The bit reorganization layer 401 extracts 128 bits from the cells of LFSR 400 and forms four 32-bit words, where the first three words will be used by the non-linear function, F 402, and the first and last words will be used to form the cipher key of the key stream. The four 32-bit words are formed by concatenating half of the bits of selected numbers according to the following formulas:

$$X_0 = s_{15H} \| s_{14L} \quad (5)$$

$$X_1 = s_{11L} \| s_{9H} \quad (6)$$

$$X_2 = s_{7L} \| s_{5H} \quad (7)$$

$$X_3 = s_{2L} \| s_{0H} \quad (8)$$

Where, H represents the leftmost 16 bits and L represents the rightmost 16 bits. However, because the numbers $s_i$ are 31-bit integers, $s_{iH}$ means bits 30 . . . 15, of $s_i$ for $0 \leq i \leq 15$.

The third layer of the ZUC application layers 40 is the non-linear function, F 402. The non-linear function F 402 operates with two 32-bit memory cells, $R_1$ and $R_2$. F 402 receives inputs, $X_0$, $X_1$, and $X_2$, from bit reorganization layer 401. F 402 then outputs a 32-bit word, W, according to the formulas:

$$W = (X_0 \oplus R_1) \boxplus R_2 \quad (9)$$

and $$W_1 = R_1 \boxplus X_1 \quad (10)$$

and $$W_2 = R_2 \oplus X_2 \quad (11)$$

The values of $R_1$ and $R_2$ for the initial run of the non-linear function, F 402 are pseudo-randomized by the ZUC algorithm. For subsequent iterations of F 402, $R_1$ and $R_2$ are defined according to the formulas:

$$R_1 = S(L_1(W_{1L} \| W_{2H})) \quad (12)$$

and $$R_2 = S(L_2(W_{2L} \| W_{1H})) \quad (13)$$

Where S is a 32×32 substitution box (S-box) composed of 4 juxtaposed 8×8 S-boxes and $L_1$ and $L_2$ are linear transforms. The symbol represents a bitwise exclusive OR operation, while the symbol $\boxplus$ represents a modulo $2^{32}$ addition. The linear transforms $L_1$ and $L_2$ transform from 32-bit words to 32-bit words, and are defined according to the following formulas:

$$L_1(X) = X \oplus (X <<<_{32} 2) \oplus (X <<<_{32} 10) \oplus (X <<<_{32} 18) \oplus (X <<<_{32} 24) \quad (14)$$

and $$L_2(X) = X \oplus (X <<<_{32} 8) \oplus (X <<<_{32} 14) \oplus (X <<<_{32} 22) \oplus (X <<<_{32} 30) \quad (15)$$

The result or side-effect of the non-linear function F 402 is then defined according to the formula:

$$F \text{ side-effect} = (S_0[i_0] << 24) | (S_1[i_1] << 16) | (S_0[i_2] << 8) | (S_1[i_3]) \quad (16)$$

Where $S_a[i_b]$ is an index operation to retrieve data at the $i_b^{th}$ index of S-box a, and $i_b$ is the $b^{th}$ byte of the input 32-bit number. These side-effects are used to generate one of the new $R_1$ or $R_2$ values. Thus, the implementation of F 402 uses three bitwise OR operations and three bitwise left-shifts in the native implementation to generate the 32-bit side-effect as indicated by equation (16). When implemented in software, processor instructions would be required to perform these operations resulting in power consumption. Likewise, a hardware implementation would require componentry to perform the operations, again resulting in power consumption.

In cryptography, S-boxes are a basic component of symmetric key algorithms which allow for performing substitutions. In block ciphers, S-boxes are typically used to obscure the relationship between the key and the cipher text. In general, an S-box takes some number of input bits and transforms them into some number of output bits through indexing or mapping to the S-box entries. As used in the ZUC algorithm, the two standard or normative S-boxes provide for number selection in which the specific number selected from the S-box is indexed according to other numbers passed to or determined by the ciphering algorithm. In the ZUC algorithm, the content of the normative S-boxes is a part of the algorithm and so does not change from one implementation to another.

Various aspects of the present disclosure provide for an optimization to make the reassembly of the two 32-bit numbers at the S-box stage of the nonlinear function F more efficient. The various aspects use specially constructed new S-boxes, based on the normative S-boxes, to take advantage of 32-bit operations.

In order to reassemble eight 1-byte values into two 4-byte values generally requires six bitwise left-shift operations and six bitwise OR operations. This is because, for each of the target 4-byte values, only one on of the input bytes retrieved from the S-boxes is properly aligned. The other three values need to be shifted to the correct positions before assembly using the bitwise left-shift operations before bitwise OR operations can begin.

The new S-boxes are constructed in such a way as to have all values retrieved from the S-boxes already aligned, so that assembly may begin immediately. Thus, the processor will not have to perform the six bitwise left-shift operations, or left-shift componentry will not be necessary in the non-linear function F. In fact, because the values of the normative S-boxes are constant and will not change, the new S-boxes may be pre-computed and stored in memory at the manufacturing stage of the wireless apparatus. The ZUC algorithm is very strictly defined, thus all of the mat may be pre-computed and pre-applied in this manner for the new S-boxes.

The new S-boxes, $S_2$, $S_3$, and $S_4$, are based on the standard or normative S-boxes, $S_0$ and $S_1$, and are defined according to the following formulas:

$$S_1 = S_1 \quad (17)$$

$$S_2 = S_0 << 24 \quad (18)$$

$$S_3 = S_1 << 16 \quad (19)$$

$$S_4 = S_0 << 8 \quad (20)$$

Where A<<B means bitwise left-shifting every element of A by B-bits. Having defined and generated new S-boxes, $S_2$, $S_3$, and $S_4$, the 32-bit number assembly logic may be changed from the native ZUC non-linear function F side-effect from equation 16.

By using the pre-aligned, newly-defined S-boxes, the number of operations can be reduced leading to the more efficient F' side-effect:

$$F' \text{ side-effect} = S_2[i_0] | S_3[i_1] | S_4[i_2] | S_1[i_3] \quad (21)$$

The bitwise shift operations are no longer necessary, thus, saving multiple processing steps. When implemented in software, this will save on the number of instructions necessary while a hardware implementation would save in componentry or componentry operations.

Figure 5:
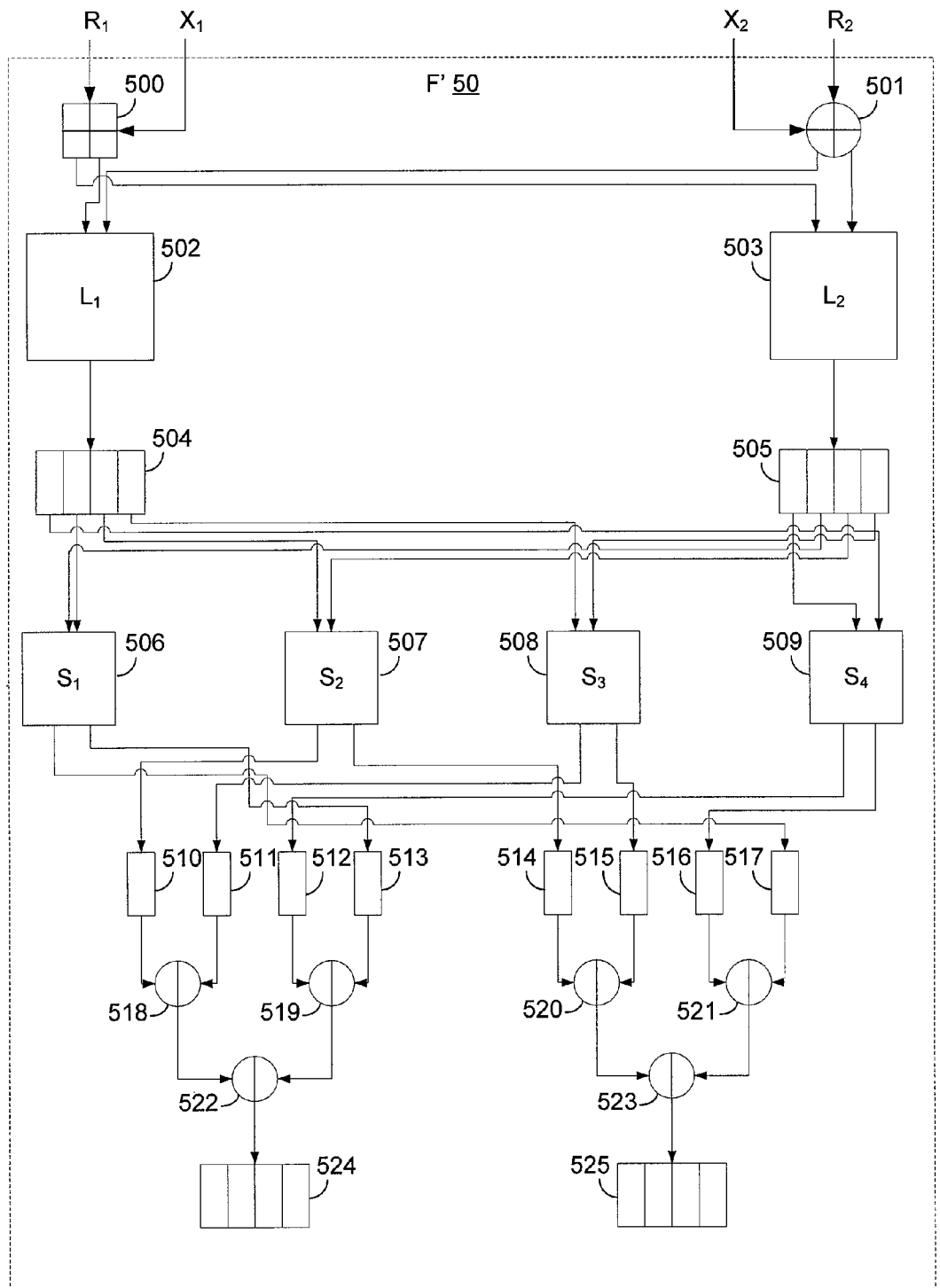
FIG. 5 is a block diagram illustrating efficient non-linear function F' configured according to one aspect of the present disclosure.

FIG. 5 is a block diagram illustrating efficient non-linear function F' 50 configured according to one aspect of the present disclosure. The portion relating to the creation of the output W is omitted for the sake of convenience. Efficient non-linear function F' 50 begins with the same inputs as provided to the existing ZUC algorithm implementations $R_1$, $R_2$, $X_1$, and $X_2$. $R_1$ and $X_1$ are added at bitwise adder 500, while $R_2$ and $X_2$ are combined at bitwise XOR 501. Half of the 32-bit sum from bitwise adder 500 is applied to linear transform, $L_2$ 503, and half is applied to linear transform, $L_1$ 502. Likewise, half of the result from bitwise XOR is applied to $L_1$ 502 and the other half applied to $L_2$.

Linear transforms L1 502 and L2 503 transforms from 32-bit words into transformed 32-bit words or 4-bytes at blocks 504 and 505, respectively. Each byte of the eight total in the 4-byte blocks 504 and 505, is used along with another byte of one of the other of the eight 4-byte blocks 504 and 505 to identify two one-byte numbers in one of S-boxes, $S_1$ 506, $S_2$ 507, $S_3$ 508, and $S_4$ 509 that will be put together to form two 4-byte words stored in $R_1$ and $R_2$, respectively. For example, one byte of 4-byte block 504 and one byte of 4-byte block 505 are used as index points for each of the S-boxes $S_1$ 506, $S_2$ 507, $S_3$ 508, and $S_4$ 509. The substituted values selected from S-boxes, $S_1$ 506, $S_2$ 507, $S_3$ 508, and $S_4$ 509, are then provided at single-byte blocks 510-517 to begin assembly. The substituted value at single-byte block 510 is combined with the substituted value at single-byte block 511 at bitwise OR component 518. Similar combinations are created with pairs at single-byte blocks 512-513, 514-515, and 516-517 at bitwise OR components 519-521. The resulting combinations from bitwise OR components 518-521 are then, themselves, combined at bitwise OR components 522 and 523, respectively, producing outputs of two 4-byte values at 4-byte blocks 524 and 525, which go into $R_1$ and $R_2$, respectively. The resulting two 32-bit values are then used in deriving the next key for the key stream output of the ZUC algorithm application.

Figure 6:
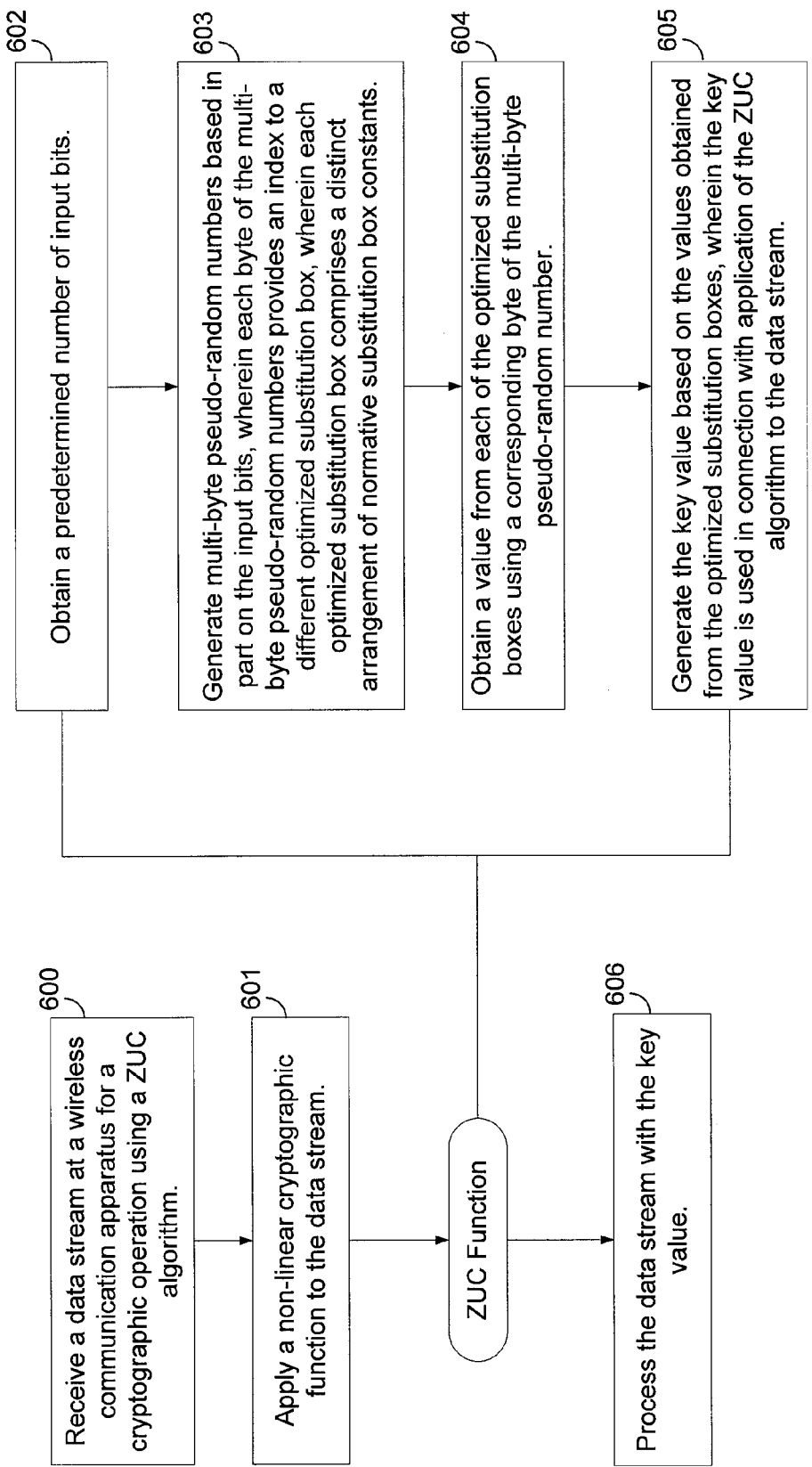
FIG. 6 is a functional block diagram illustrating example blocks executed to implement one aspect of the present disclosure.

FIG. 6 is a functional block diagram illustrating example blocks executed to implement one aspect of the present disclosure. In block 600, a wireless communication apparatus receives a data stream at a wireless communication apparatus for a cryptographic operation that uses a ZUC algorithm. As a transmitter, data and information intended for communication with another mobile device is identified for transmission. Before transmission, the intended data and information is encrypted. As a receiver, encrypted text is received as the data stream. Thus, in order to process the encrypted data and information, the encrypted data stream is unencrypted.

In block 601, the wireless communication apparatus applies a non-linear cryptographic function to the data stream. The ZUC cryptographic function which provides encryption of plain text to be transmitted or provides deciphering of encrypted text to be processed includes, at block 602, obtaining a predetermined number of input bits. The input bits may be obtained from a linear feedback shift register of the ZUC algorithm. A bit reorganization layer of the ZUC algorithm may function to reorganize the input bits to form a plurality of multi-bit words from the predetermined number of bits extracted from the linear feedback shift register. At block 603, multi-byte pseudo-random numbers are generated based on the input bits, wherein each byte of the multi-byte pseudo-random number provides an index to a different optimized substitution box of a plurality of optimized substitution boxes. Each of these optimized substitution boxes is a distinct arrangement of one or more normative substitution boxes used in the ZUC algorithm.

The ZUC cryptographic function continues, at block 604, by obtaining a value from each of the optimized substitution boxes using a corresponding byte of the multi-byte pseudo-random number as an index. When these values are retrieved, the ZUC algorithm may operate to assemble the retrieved values into at least one substituted value. The cryptographic function may then generate at least one key value based on the substituted value or values obtained from the optimized substitution boxes, at block 605. The key value may be used in applying the non-linear cryptographic function to the data stream, as part of the operation of block 601. At block 606, the wireless communication apparatus processes the data stream after application of the non-linear cryptographic function at block 601. In the case of the transmitter, the processing would include transmitting the encrypted text to the intended recipient. In the case of the receiver, the processing would include processing of the plain text.

Figure 7:
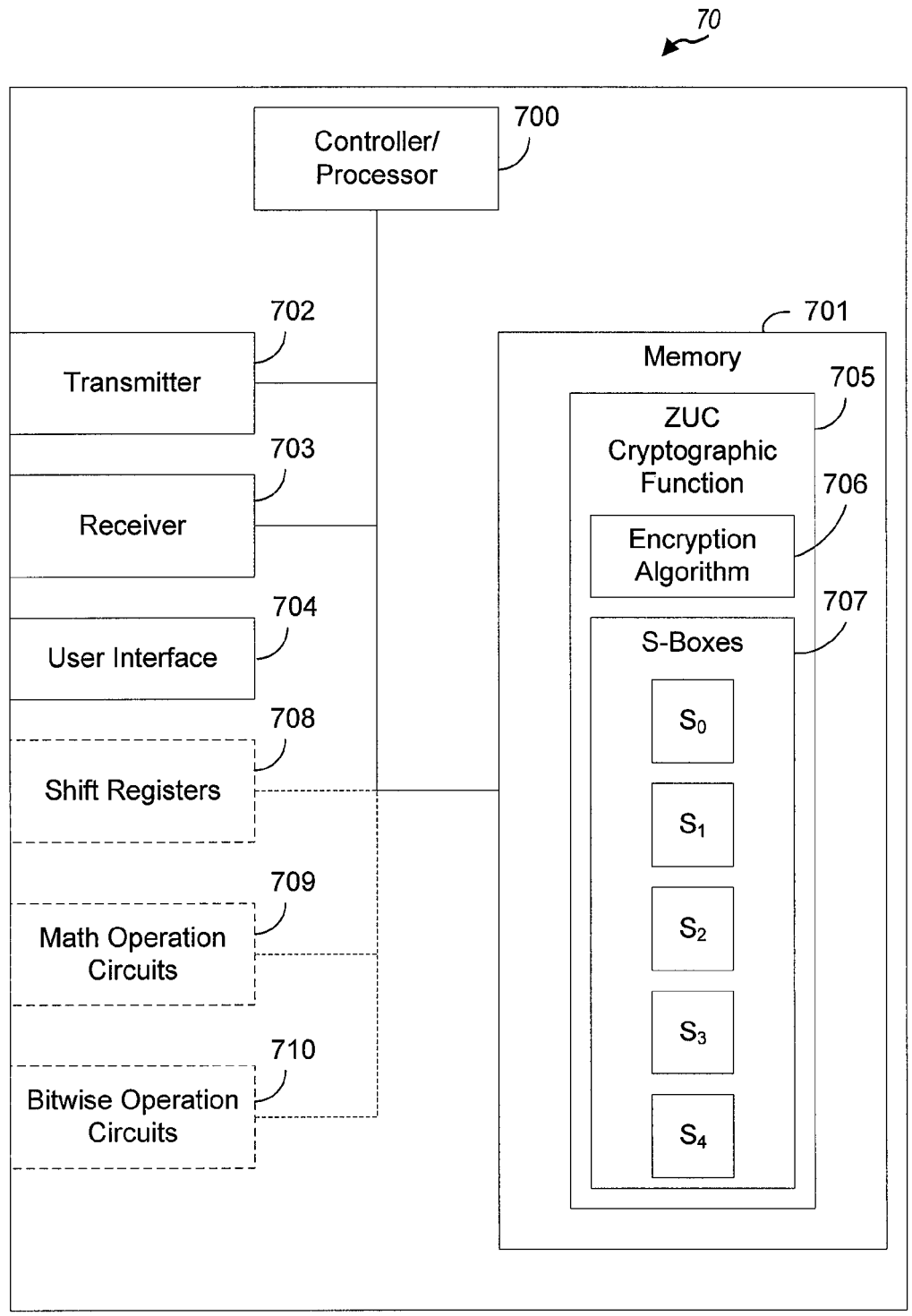
FIG. 7 is a block diagram of a wireless communication apparatus configured according to one aspect of the present disclosure.

FIG. 7 is a block diagram of a wireless communication apparatus 70 configured according to one aspect of the present disclosure. Wireless communication apparatus 70 includes a number of components, including, among others not shown, controller/processor 700, memory 701, transmitter 702, receiver 703, and user interface 704. Controller/processor 700 controls the hardware functionality and executes applications and logic stored in memory 701 that provides the features and functionality of wireless communication device 70. Wireless communication apparatus 70 may be implemented as a transmitter or receiver entity, which may be a mobile device, access point, base station, or the like.

When operating as a transmitter, wireless communication apparatus 70 may receive a data stream through user interface 704. User interface 704, under control of controller/processor 700 captures user input from various input sources, such as a touch screen, camera, microphone, or the like entered by the user. The captured data stream represents data that the user desires to transmit to another user. When operating as a receiver, wireless communication apparatus 70 may receive a data stream via receiver 703 under control of controller/processor 700. The encrypted text received in the data stream originates from the sender and, in order to use the information and data transmitted, the user of wireless communication apparatus 70 will first decipher the encrypted text into plain text. The combination of these components and acts may provide means for receiving a data stream at a wireless communication apparatus for a cryptographic function and means for applying the cryptographic function to the data stream.

When ciphering or deciphering is needed in order to either prepare plain text for transmission to an intended party or to discover the plain text obscured in the encrypted text, wireless communication apparatus 70, under control of controller/processor 700, executes a cryptographic function, such as ZUC cryptographic function 705, stored in memory 701 for processing the data stream. ZUC cryptographic function 705, as executed by controller/processor 700, may provide a purely software encryption process or may provide a combination process that utilizes both software functions executed by controller/processor 700 and activity of operation circuits, such as shift registers 708, math operation circuits 709 which may include adders, subtractors, comparators, and the like, and bitwise operation circuits 710 which may include bitwise versions of various mathematical operations, such as bitwise OR, XOR, adders, and the like. The combination of these components and actions may provide means for applying the cryptographic function to the data stream.

The controller/processor 700 executing ZUC cryptographic function 705 includes an encryption algorithm 706 and S-boxes 707. In the described aspect of the present disclosure, S-boxes 707 not only includes the normative S-boxes, $S_0$ and $S_1$, but also includes the newly generated S-boxes, $S_2$, $S_3$, and $S_4$, based on $S_0$ and $S_1$. Through execution of encryption algorithm 706 or a combination of executing encryption algorithm 706 and operation of shift registers 707, math operation circuits 709, and bitwise operation circuits 710, the first two layers of the encryption algorithm 706 may be operated to generate several multi-byte pseudo-random numbers that are used as indexes to the S-boxes 707. The combination of these components and actions may provide means for extracting a predetermined number of bits from a linear feedback shift register of the ZUC cryptographic function, means for forming a plurality of multi-bit words from the predetermined number of bits, and means for generating at least one multi-byte pseudo-random number based in part on a first number of multi-bit words of the plurality of multi-bit words, wherein the first number is less than the plurality of multi-bit words, wherein each byte of the at least one multi-byte pseudo-random number provides an index to one of a plurality of substitution boxes, wherein each of the plurality of substitution boxes is based on one or more normative substitution boxes.

The controller/processor 700, in operation of the executing cryptographic function 705, the multi-byte pseudo-random numbers may be used by controller/processor 700 to index the S-boxes stored in S-boxes 707 to find and retrieve a number from each of the S-boxes. The combination of these components and actions provide means for retrieving a value from each of the plurality of substitution boxes using each byte of the at least one multi-byte pseudo-random number.

With the numbers that are retrieved from the S-boxes, controller/processor 700, in executing ZUC cryptographic function 705, may assemble those numbers into at least one substituted value. The controller/processor 700 may execute code for assembling such numbers or may leverage bitwise operation circuits 710, which are present in various alternative aspects of wireless communication apparatus 70, to assemble the numbers. The combination of these components and actions may provide means for assembling the plurality of retrieved values into at least one substituted values.

The executing ZUC cryptographic function 705 then uses these substituted values to generate keys that are used in ciphering or deciphering the data stream. The combination of these components and actions may provide means for generating at least one key value based on the at least one substituted values, wherein the key value is used in the means for applying the cryptographic function to the data stream. With the cryptographic function applied to the data stream producing either an encrypted data stream, in the case of a transmitter, or a plain text data stream, in the case of a receiver, the controller/processor 700 may then process the data stream as intended by either transmitting the data stream using transmitter 702 or consuming the plain text data stream using user interface 704 or other logic or application stored in memory 701. The combination of these components and actions may provide means for processing the data stream after application of the cryptographic function.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving a data stream at a wireless communication apparatus for a cryptographic operation using a ZUC algorithm;
   applying a cryptographic function to the data stream, wherein the cryptographic function includes:
      obtaining a predetermined number of input bits, and
      generating at least one multi-byte pseudo-random number based in part on the input bits, wherein each byte of the at least one multi-byte pseudo-random number provides an index to a different one of a plurality of optimized substitution boxes, each optimized substitution box comprising a plurality of values derived from a corresponding normative ZUC substitution box, wherein each optimized substitution box corresponds to at least one of the normative ZUC substitution boxes (S0,S1), and the plurality of values comprise bitwise shifted versions of corresponding normative ZUC substitution box constants, wherein the plurality of optimized substitution boxes comprises three substitution boxes in which two of the three optimized substitution boxes are derived from a first (S0) normative ZUC substitution box and one of the three optimized substitution boxes is derived from a second (S1) normative ZUC substitution box, and wherein the plurality of values in each optimized substitution box is bitwise shifted with a different shift in relation to its corresponding at least one normative ZUC substitution box;
      obtaining a value from each of the plurality of optimized substitution boxes using a corresponding byte of the at least one multi-byte pseudo-random number;
      generating at least one key value based on the values obtained from each of the optimized substitution boxes, wherein the key value is used in connection with applying the ZUC cryptographic algorithm to the data stream; and
   processing the data stream with the at least one key value.

2. The method of claim 1, wherein the cryptographic function further comprises performing a bitwise-OR operation on the values obtained from the plurality of optimized substitution boxes.

3. The method of claim 1, wherein the cryptographic operation comprises one of:
   ciphering; and
   deciphering.

4. The method of claim 3, wherein the processing includes processing the deciphered data stream.

5. The method of claim 3, wherein the processing includes transmitting the ciphered data stream.

6. An apparatus configured for wireless communication, comprising:
   means for receiving a data stream at a wireless communication apparatus for a cryptographic operation using a ZUC algorithm;
   means for applying a cryptographic function to the data stream, wherein the cryptographic function includes:
      means for obtaining a predetermined number of input bits, and
      means for generating at least one multi-byte pseudo-random number based in part on the input bits, wherein each byte of the at least one multi-byte pseudo-random number provides an index to a different one of a plurality of optimized substitution boxes, each optimized substitution box comprising a plurality of values derived from a corresponding normative ZUC substitution box, wherein each optimized substitution box corresponds to at least one of the normative ZUC substitution boxes (S0,S1), and the plurality of values comprise bitwise shifted versions of corresponding normative ZUC substitution box constants, wherein the plurality of values in each optimized substitution box is bitwise shifted with a different shift in relation to the at least one corresponding normative ZUC substitution box, and wherein the plurality of optimized substitution boxes comprises three substitution boxes in which two of the three optimized substitution boxes are derived from a first (S0) normative ZUC substitution box and one of the three optimized substitution boxes is derived from a second (S1) normative ZUC substitution box, and wherein the plurality of values in each optimized substitution box is bitwise shifted with a different shift in relation to its corresponding at least one normative ZUC substitution box;
      means for obtaining a value from each of the plurality of optimized substitution boxes using a corresponding byte of the at least one multi-byte pseudo-random number;
      means for generating at least one key value based on the values obtained from each of the optimized substitution boxes, wherein the key value is used in connection with the means for applying the ZUC cryptographic algorithm to the data stream; and
   means for processing the data stream with the at least one key value.

7. The apparatus of claim 6, wherein the cryptographic function further comprises performing a bitwise-OR operation on the values obtained from the plurality of optimized substitution boxes.

8. The apparatus of claim 6, wherein the cryptographic operation comprises one of:
   ciphering; and
   deciphering.

9. The apparatus of claim 8, wherein the means for processing includes means for processing the deciphered data stream.

10. The apparatus of claim 8, wherein the means for processing includes means for transmitting the ciphered data stream.

11. A computer program product for wireless communications in a wireless network, comprising:
a non-transitory computer-readable medium having program code recorded thereon, the program code including:
program code to receive a data stream at a wireless communication apparatus for a cryptographic operation using a ZUC algorithm;
program code to apply a cryptographic function to the data stream, wherein the cryptographic function includes:
program code to obtain a predetermined number of input bits, and
program code to generate at least one multi-byte pseudo-random number based in part on the input bits, wherein each byte of the at least one multi-byte pseudo-random number provides an index to a different one of a plurality of optimized substitution boxes, each optimized substitution box comprising a plurality of values derived from a corresponding normative ZUC substitution box, wherein each optimized substitution box corresponds to at least one of the normative ZUC substitution boxes (S0,S1), and the plurality of values comprise bitwise shifted versions of corresponding normative ZUC substitution box constants, wherein the plurality of values in each optimized substitution box is bitwise shifted with a different shift in relation to the at least one corresponding normative ZUC substitution box, and wherein the plurality of optimized substitution boxes comprises three substitution boxes in which two of the three optimized substitution boxes are derived from a first (S0) normative ZUC substitution box and one of the three optimized substitution boxes is derived from a second (S1) normative ZUC substitution box, and wherein the plurality of values in each optimized substitution box is bitwise shifted with a different shift in relation to its corresponding at least one normative ZUC substitution box;
program code to obtain a value from each of the plurality of optimized substitution boxes using a corresponding byte of the at least one multi-byte pseudo-random number;
program code to generate at least one key value based on the values obtained from each of the optimized substitution boxes, wherein the key value is used in connection with the program code to apply the ZUC cryptographic algorithm to the data stream; and
program code to process the data stream with the at least one key value.

12. The computer program product of claim 11, wherein the cryptographic function further comprises performing a bitwise-OR operation on the values obtained from the plurality of optimized substitution boxes.

13. The computer program product of claim 11, wherein the cryptographic operation comprises one of:
ciphering; and
deciphering.

14. The computer program product of claim 13, wherein the program code to process includes program code to process the deciphered data stream.

15. The computer program product of claim 13, wherein the program code to process includes program code to transmit the ciphered data stream.

16. An apparatus configured for wireless communication, the apparatus comprising:
at least one processor; and
a memory coupled to the at least one processor,
wherein the at least one processor is configured:
to receive a data stream at a wireless communication apparatus for a cryptographic operation using a ZUC algorithm;
to apply a cryptographic function to the data stream, wherein the cryptographic function includes configuration of the at least one processor:
to obtain a predetermined number of input bits, and
to generate at least one multi-byte pseudo-random number based in part on the input bits, wherein each byte of the at least one multi-byte pseudo-random number provides an index to a different one of a plurality of optimized substitution boxes, each optimized substitution box comprising a plurality of values derived from a corresponding normative ZUC substitution box, wherein each optimized substitution box corresponds to at least one of the normative ZUC substitution boxes (S0,S1), and the plurality of values comprise bitwise shifted versions of corresponding normative ZUC substitution box constants, wherein the plurality of values in each optimized substitution box is bitwise shifted with a different shift in relation to the at least one corresponding normative ZUC substitution box, and wherein the plurality of optimized substitution boxes comprises three substitution boxes in which two of the three optimized substitution boxes are derived from a first (S0) normative ZUC substitution box and one of the three optimized substitution boxes is derived from a second (S1) normative ZUC substitution box, and wherein the plurality of values in each optimized substitution box is bitwise shifted with a different shift in relation to its corresponding at least one normative ZUC substitution box;
to obtain a value from each of the plurality of optimized substitution boxes using a corresponding byte of the at least one multi-byte pseudo-random number;
to generate at least one key value based on the values obtained from each of the optimized substitution boxes, wherein the key value is used in connection with the configuration to apply the ZUC cryptographic algorithm to the data stream; and
to process the data stream with the at least one key value.

17. The apparatus of claim 16, wherein the cryptographic function further comprises performing a bitwise-OR operation on the values obtained from the plurality of optimized substitution boxes.

18. The apparatus of claim 16, wherein the cryptographic operation comprises one of:
ciphering; and
deciphering.

19. The apparatus of claim 18, wherein the configuration of the at least one processor to process includes configuration to process the deciphered data stream.

20. The apparatus of claim 18, wherein the configuration of the at least one processor to process includes configuration to transmit the ciphered data stream.

* * * * *